*E Fitzgerald,*
*Braider.*

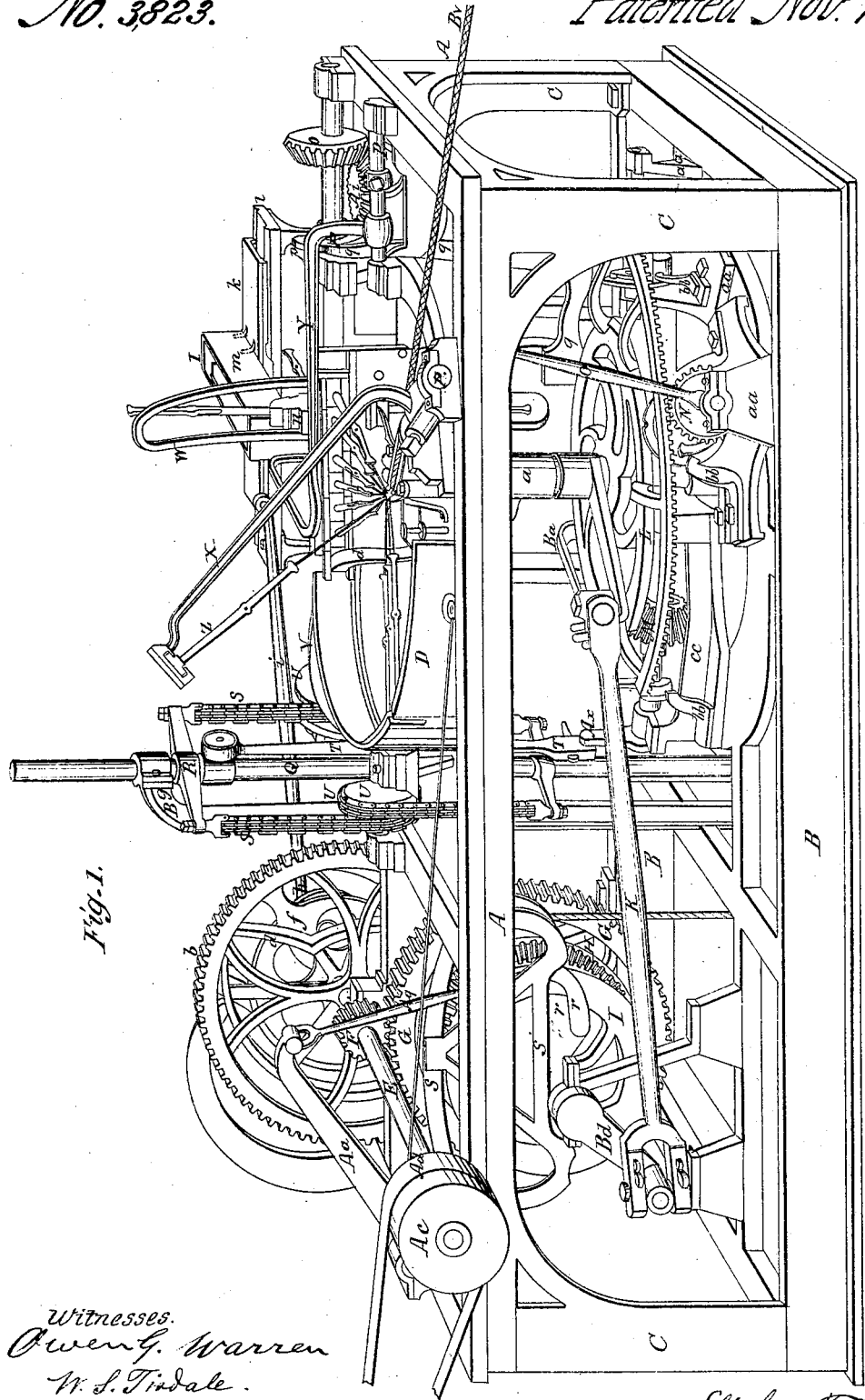

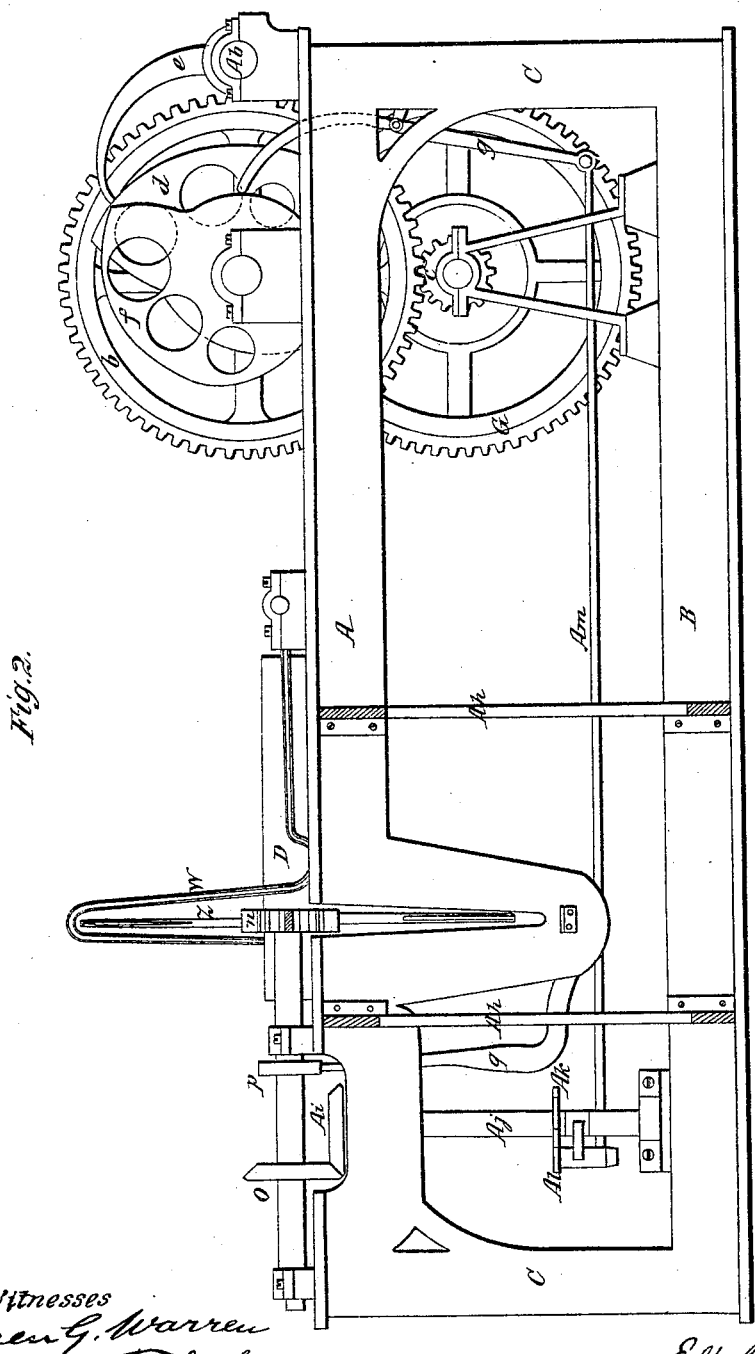

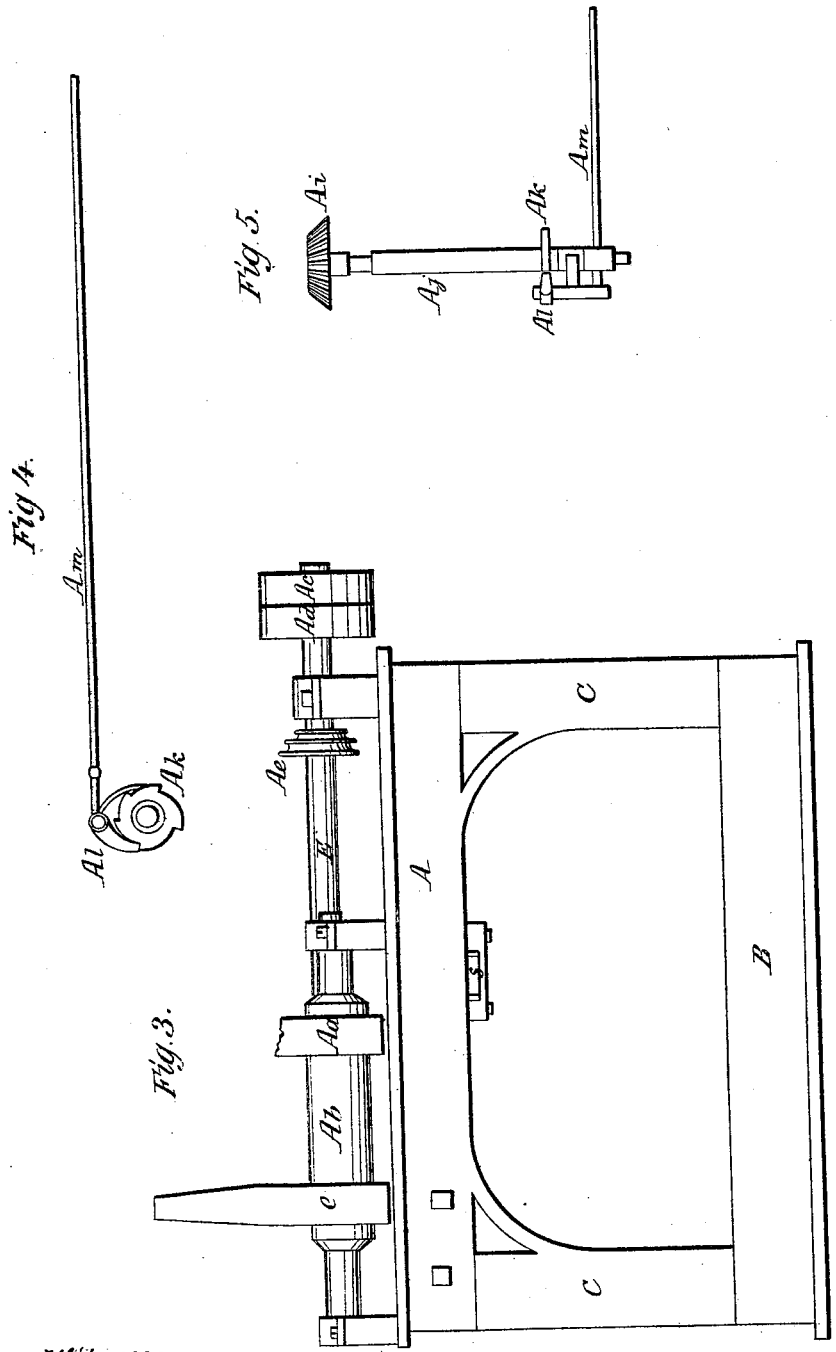

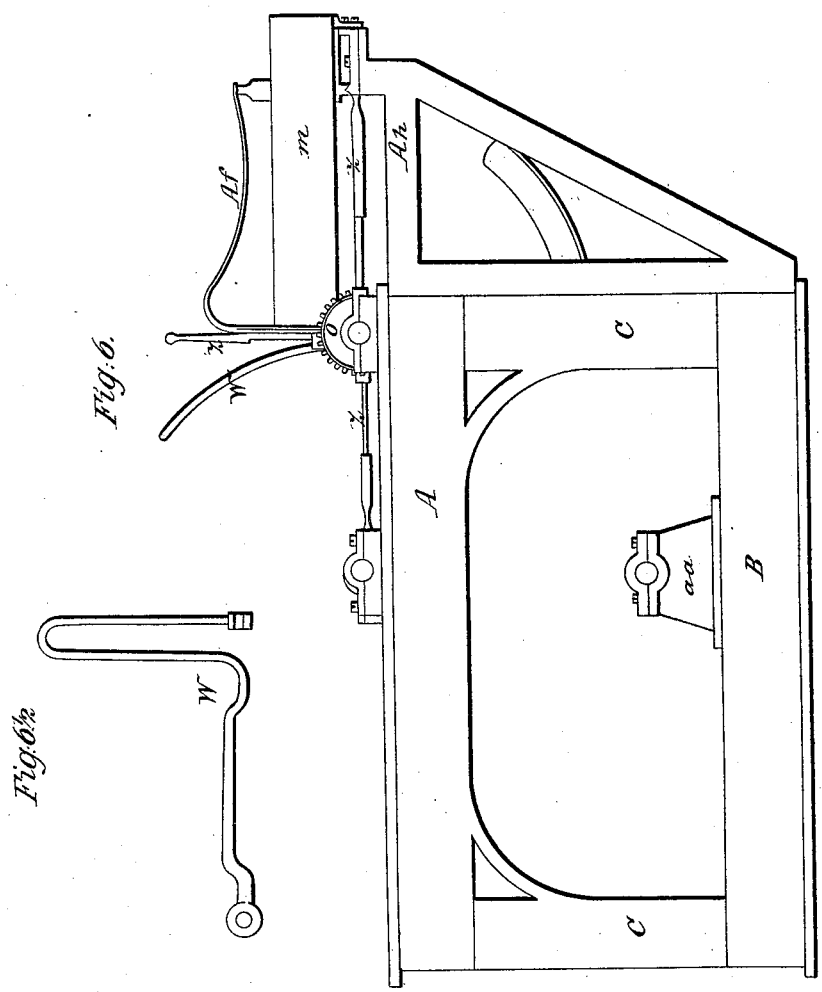

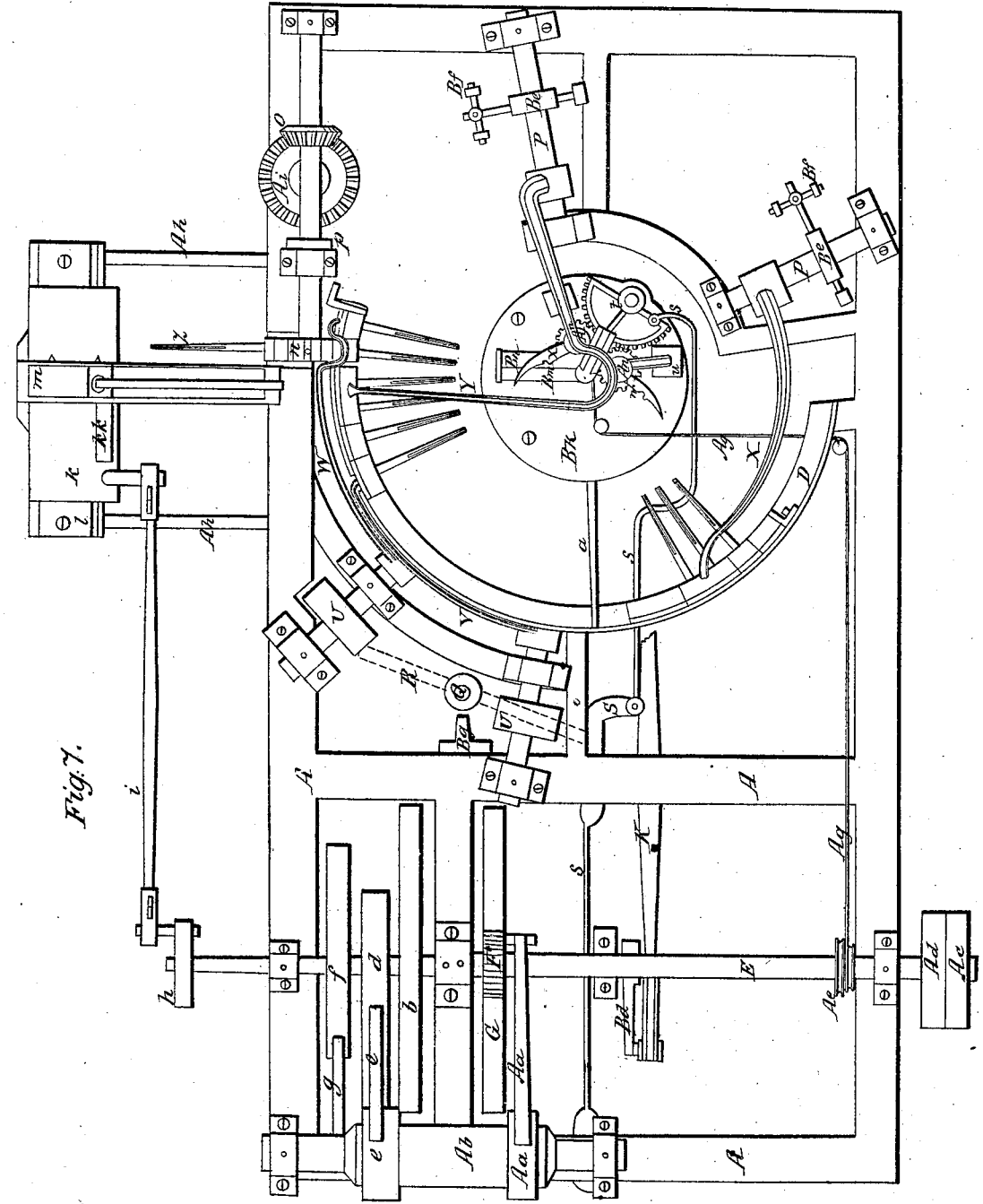

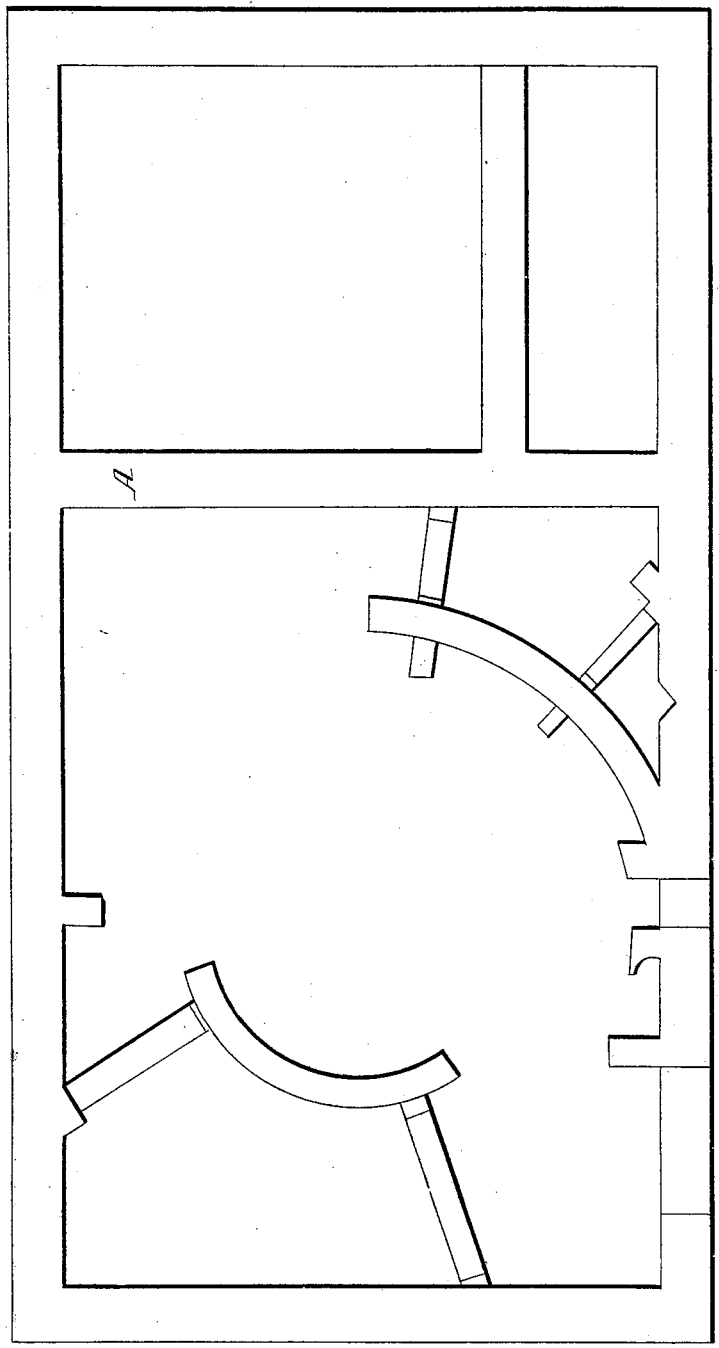

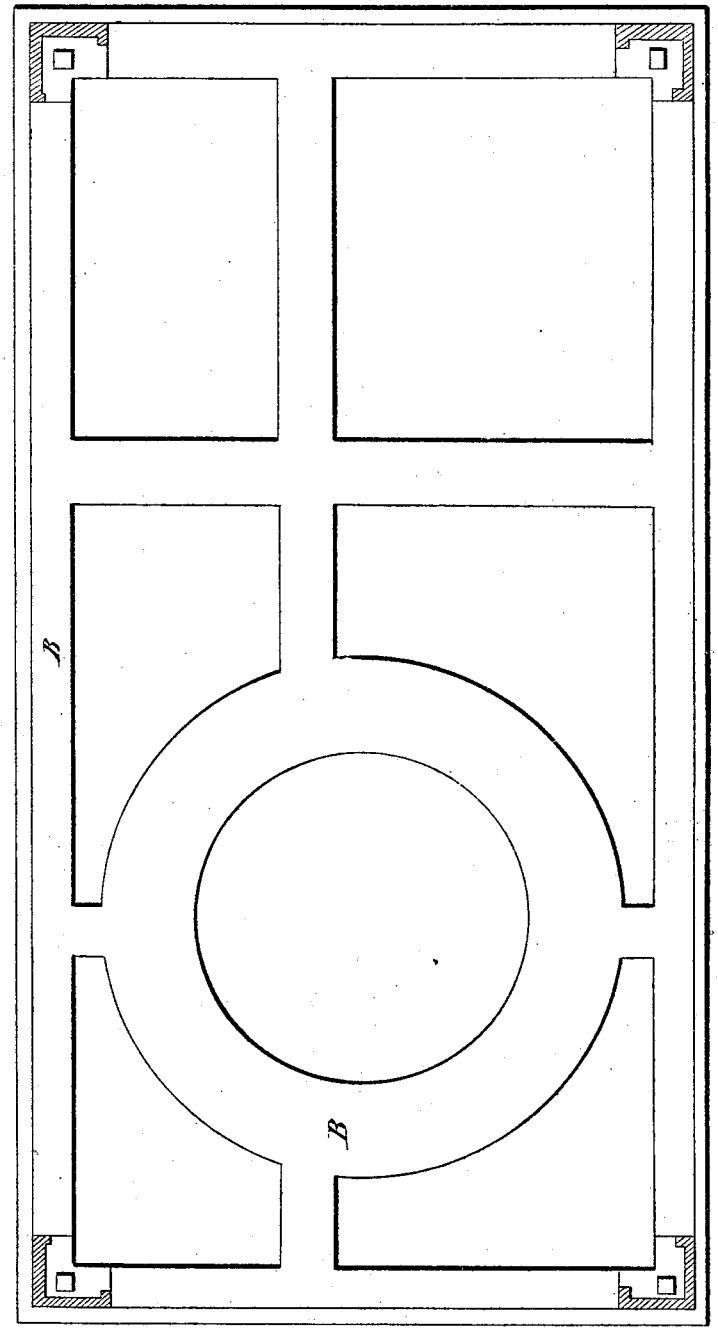

No. 3,823.   Patented Nov. 13, 1844.

Witnesses:
Owen G. Warren.
W. S. Tisdale.

Inventor:
Elisha Fitzgerald.

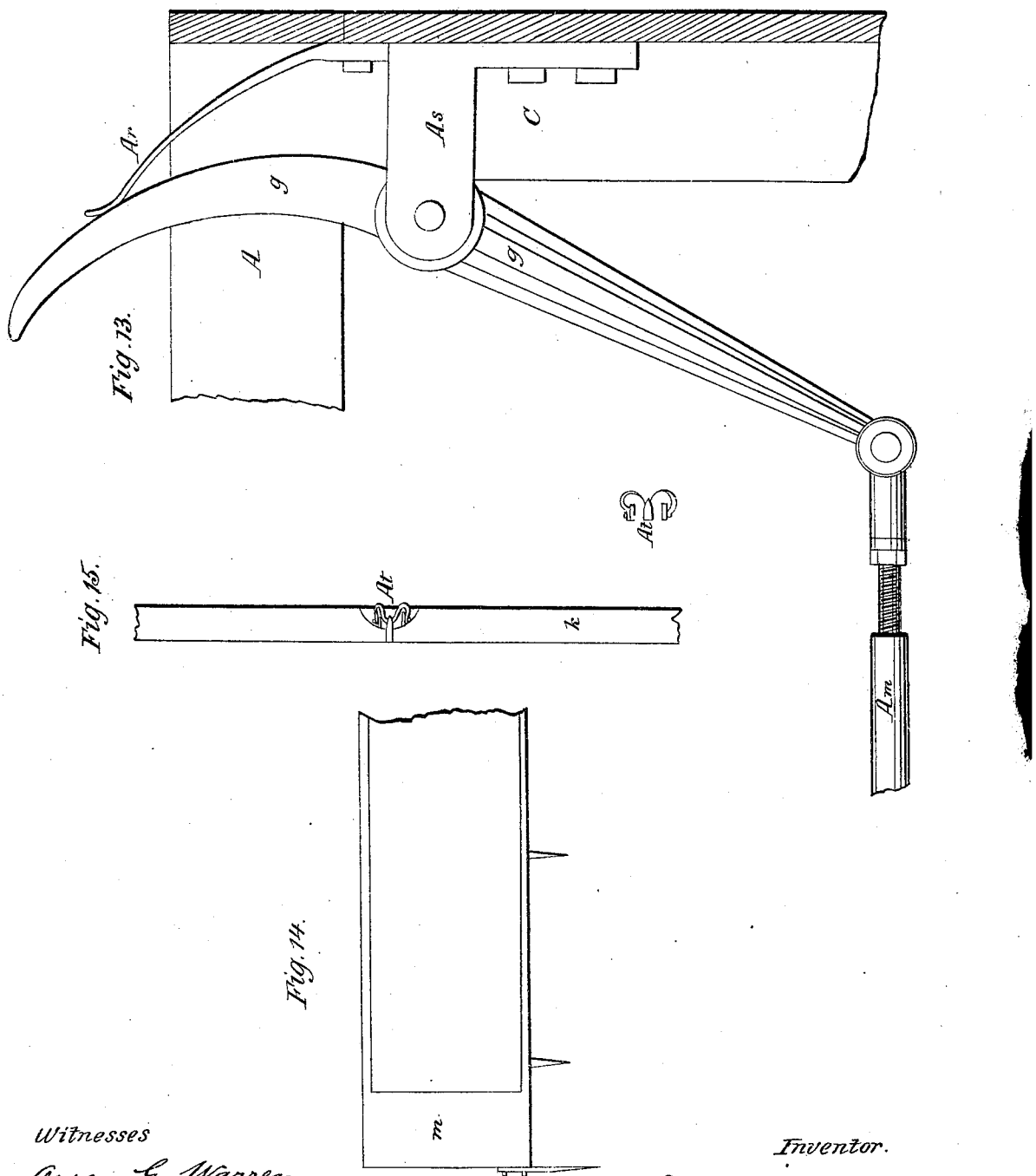

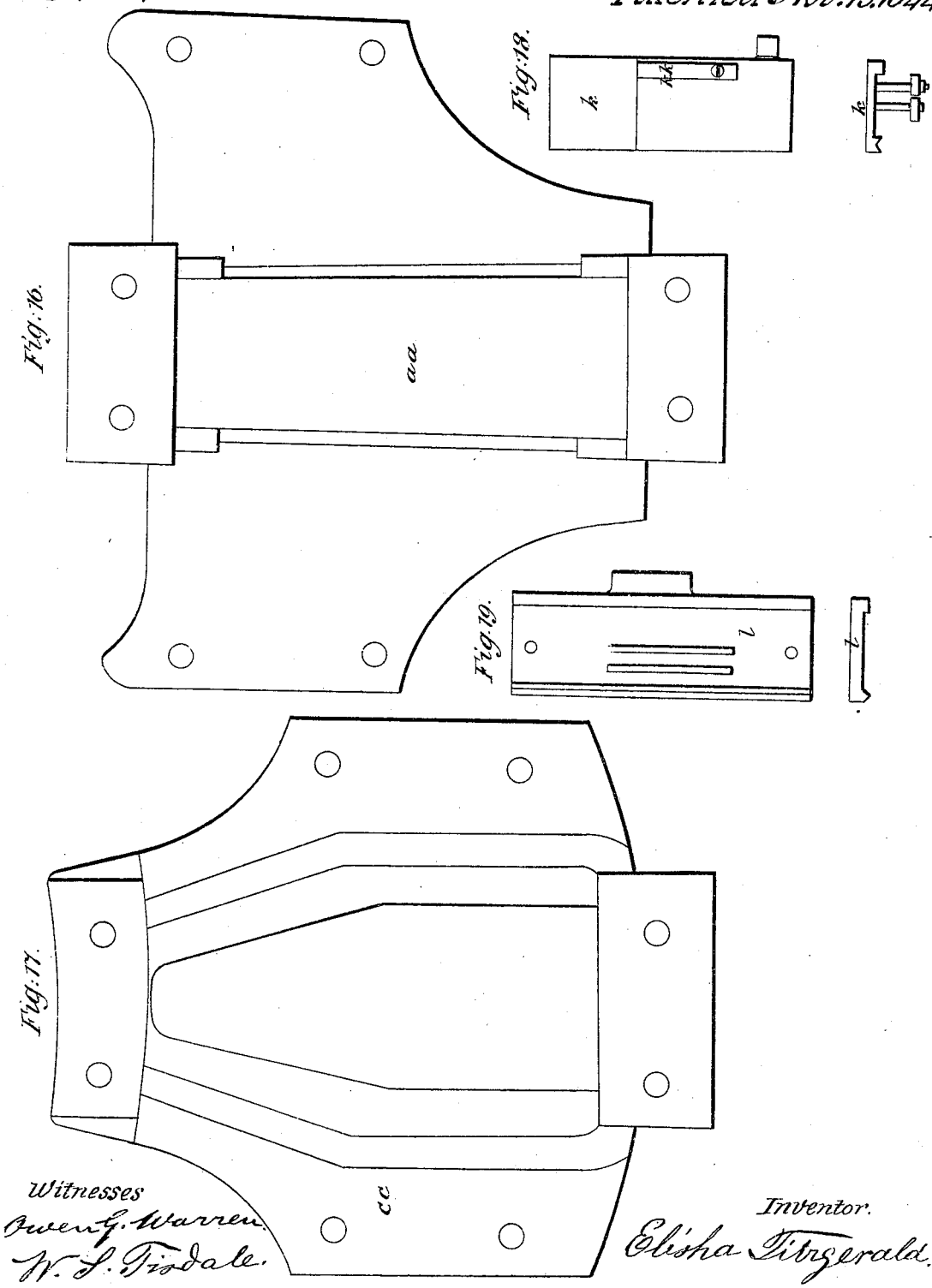

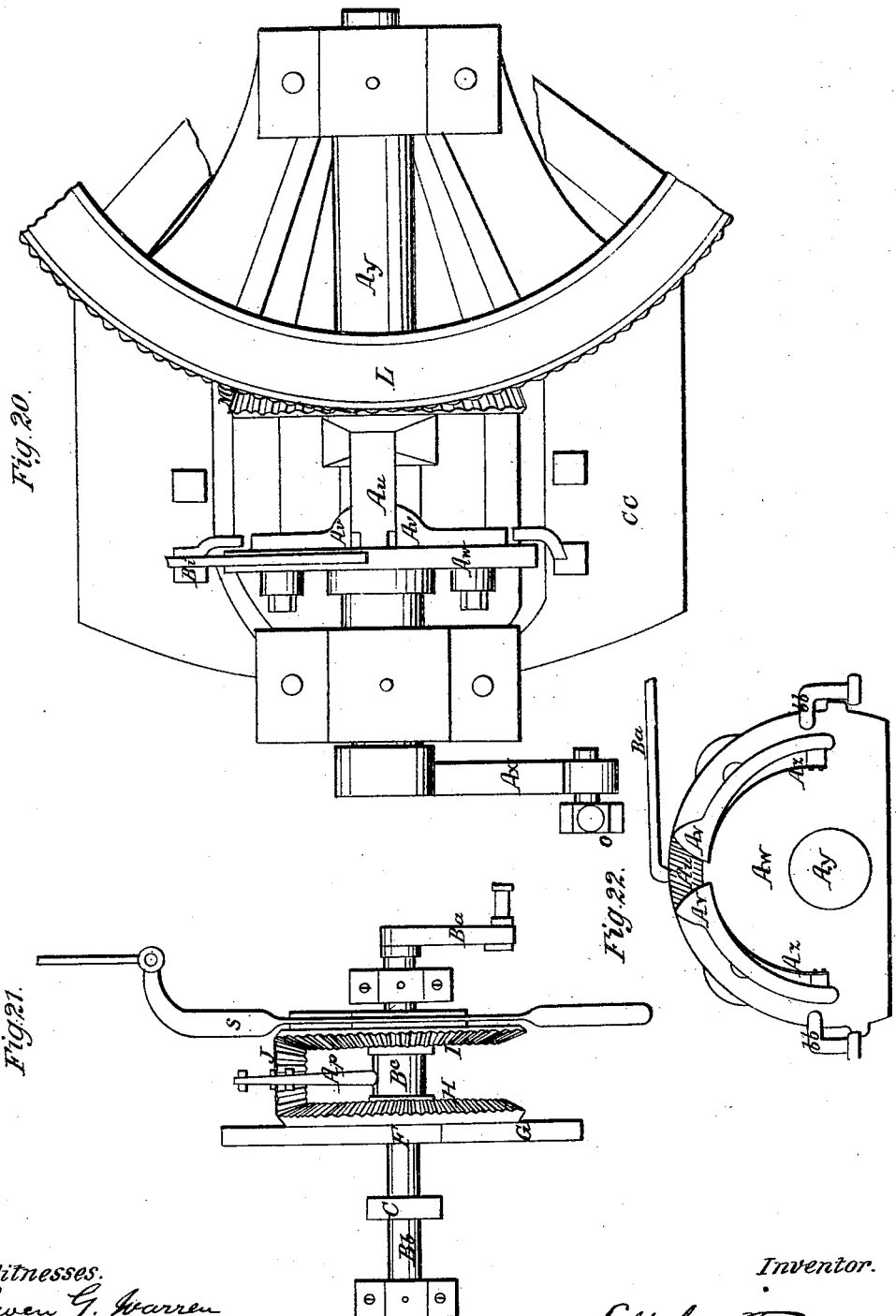

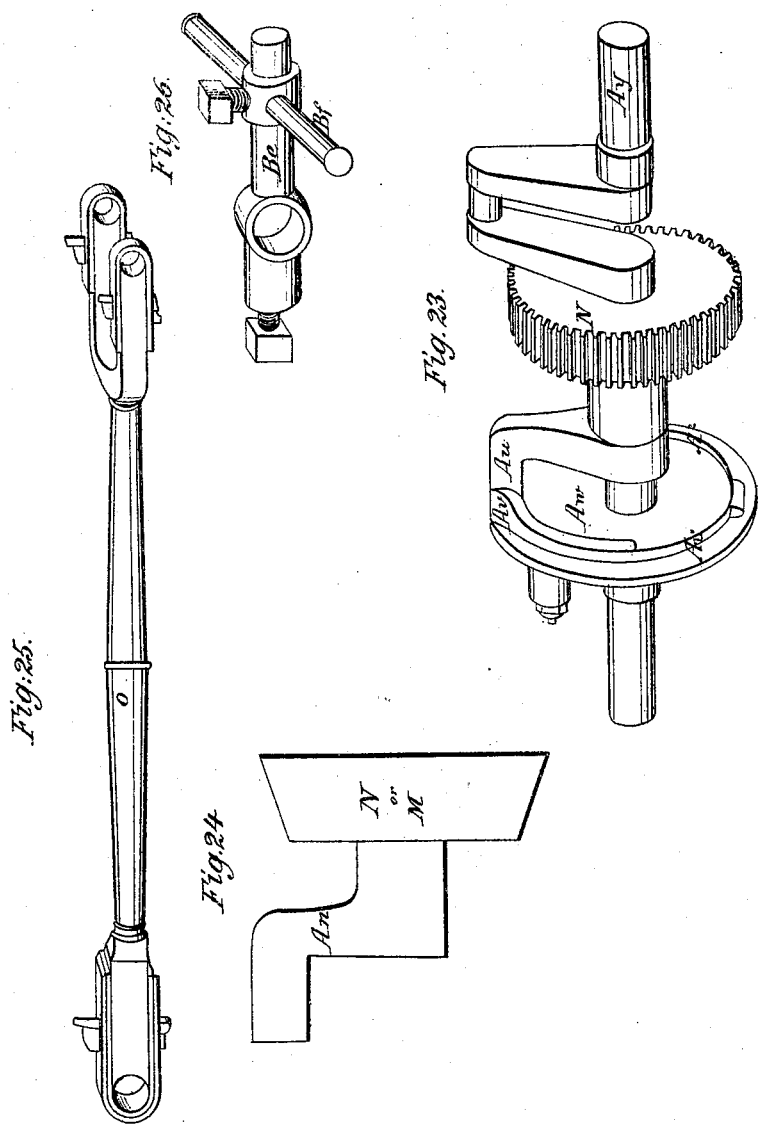

18 Sheets. Sheet 13.

E. Fitzgerald,
Braider.

No. 3,823.    Patented Nov. 13. 1844.

Witnesses
Owen G. Warren
W. S. Tisdale.

Inventor.
Elisha Fitzgerald

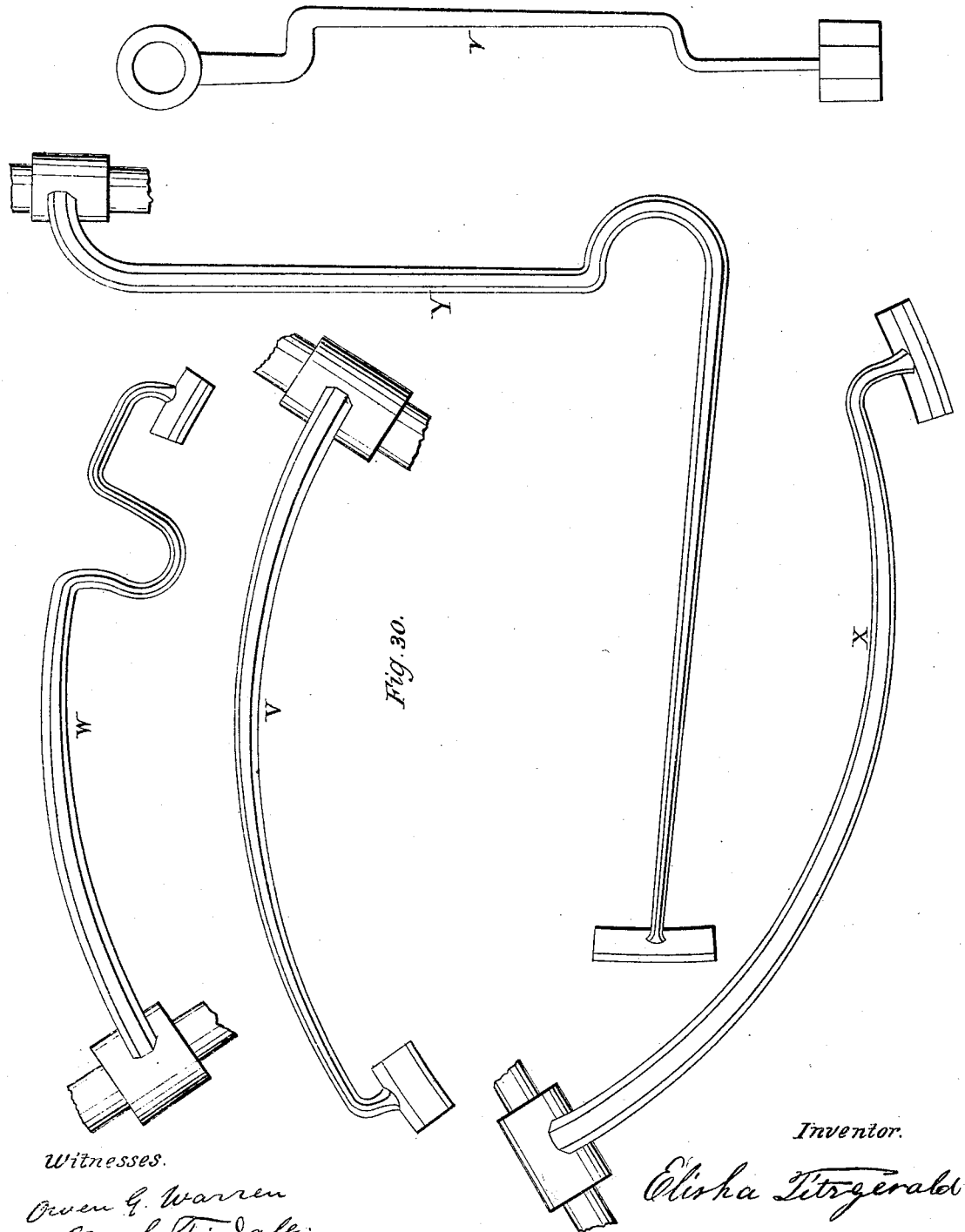

E. Fitzgerald,
Braider.
No. 3,823.
18 Sheets Sheet.15
Patented Nov.13,1844.
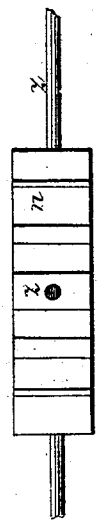
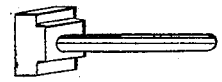
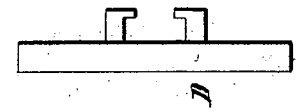
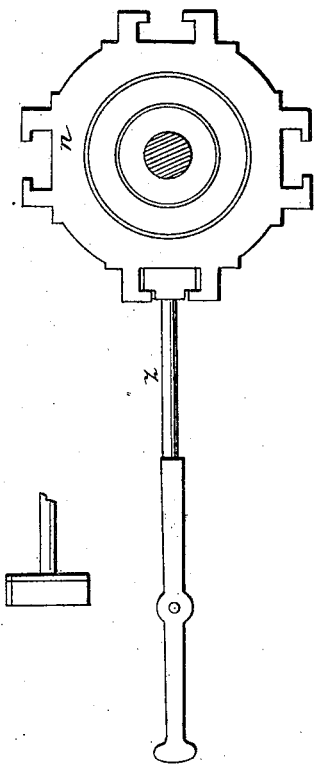
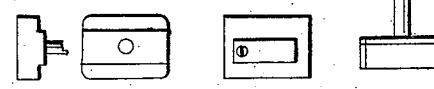
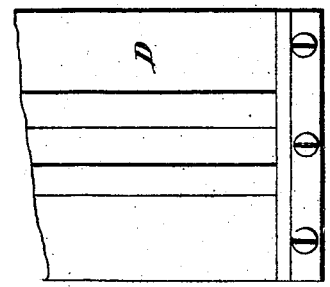
Witnesses
Owen G. Warren
W. S. Tisdale.
Inventor.
Elisha Fitzgerald E. Fitzgerald,
Braider.
No. 3,823.   Patented Nov. 13. 1844.
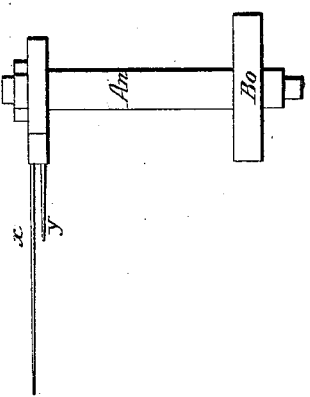
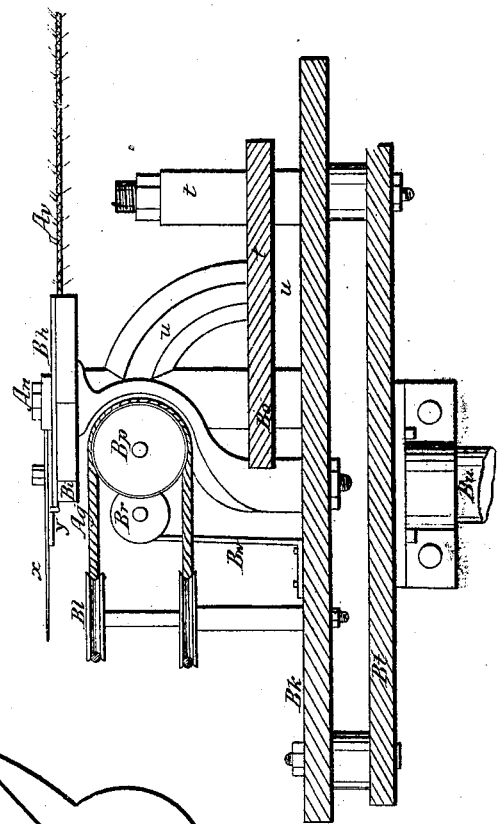
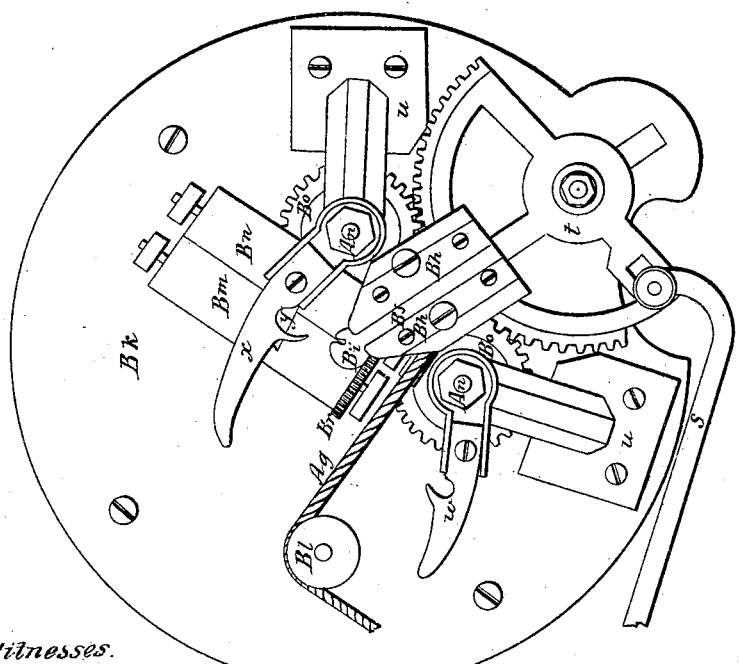

E. Fitzgerald,
Braider.

No. 3,823.

Patented Nov. 13, 1844.

18 Sheets, Sheet 17.

Witnesses
Owen G. Warren
W. S. Tisdale

Inventor
Elisha Fitzgerald

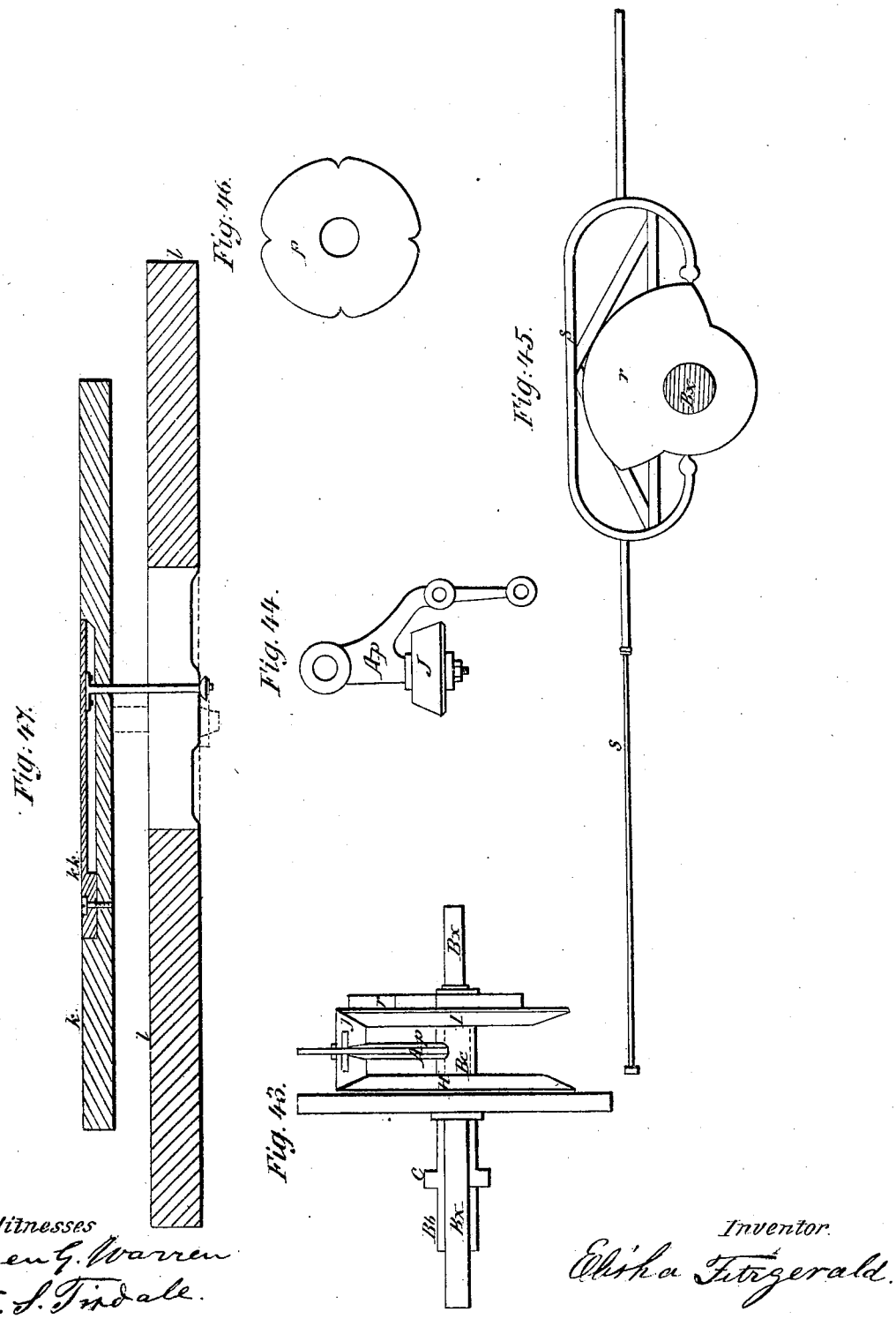

UNITED STATES PATENT OFFICE.

ELISHA FITZGERALD, OF NEW YORK, N. Y.

MACHINE FOR WEAVING TUSCAN AND OTHER BRAIDS.

Specification of Letters Patent No. 3,823, dated October 16, 1844.

*To all whom it may concern:*

Be it known that I, ELISHA FITZGERALD, of New York, N. Y., have invented a Machine for Weaving Tuscan and other Braids, of which the following is a description.

This invention is called the "Tuscan braiding machine." Its object is to make the Tuscan or Leghorn braid, but will serve for braiding other materials.

The machine is constructed of metal, chiefly of iron and steel.

To enable others to make and use it a full description is given in detail with reference to the eighteen sheets of drawings which are hereunto annexed.

The same figures and letters will be used to refer to the same things in all the drawings. The figures and drawings one third size of the working machine unless otherwise understood.

Figure 11:
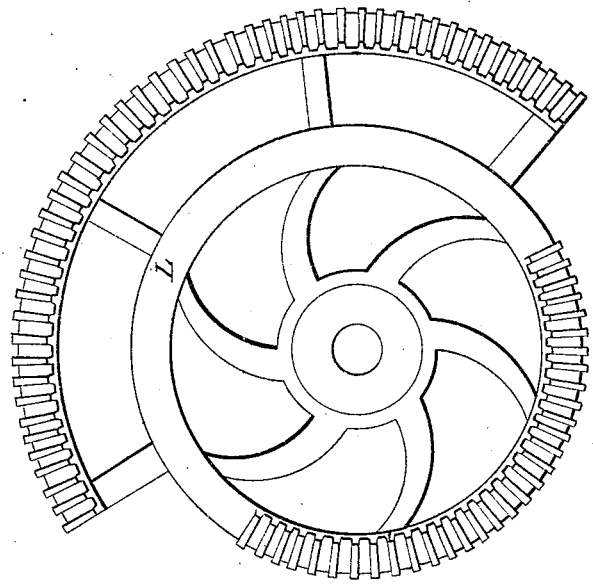
Figure 12:
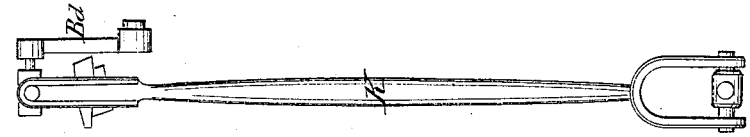
Figure 10:
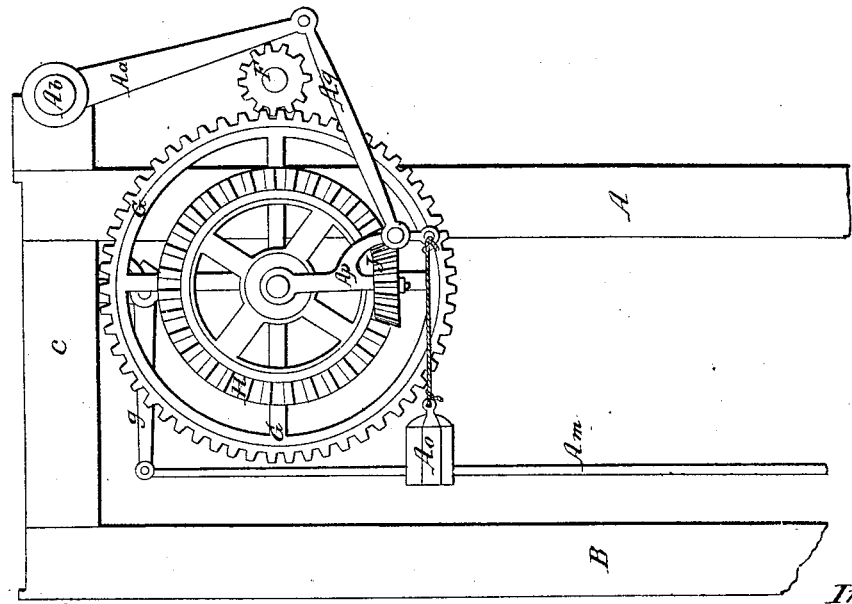
Figure 28:
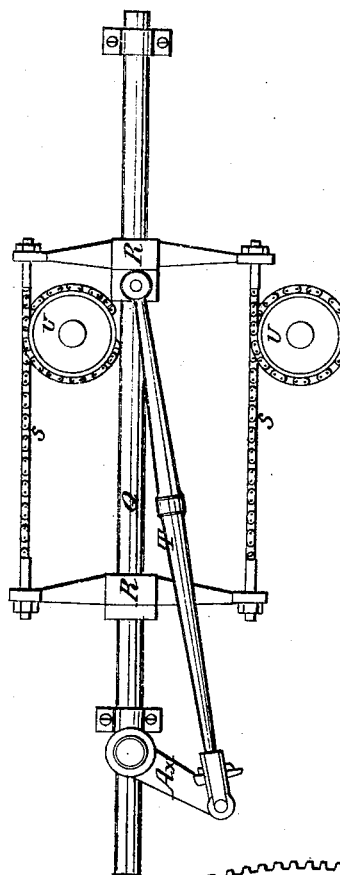
Figure 29:
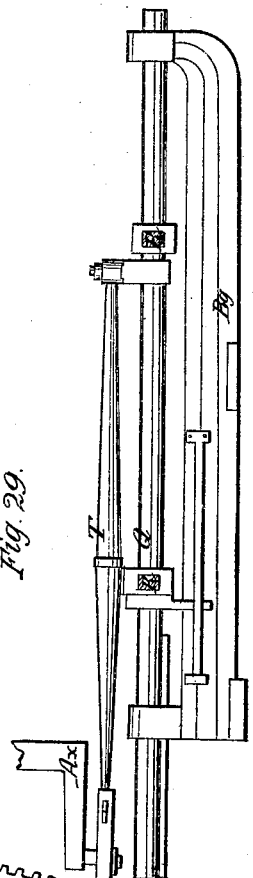
Figure 27:
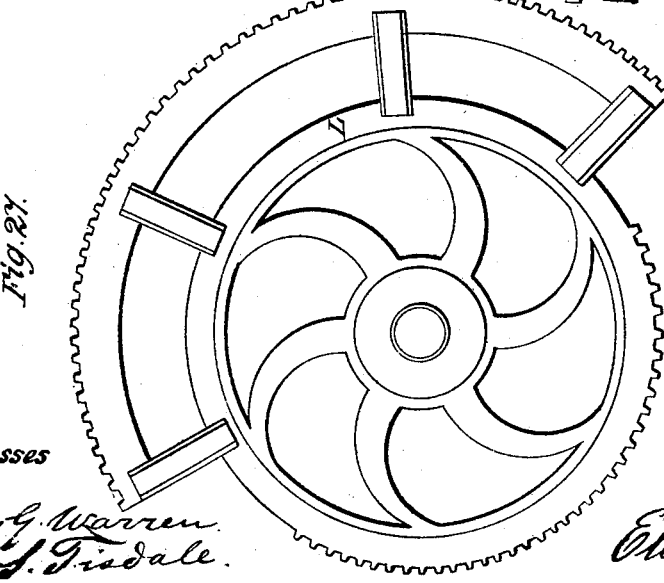
Figure 38:
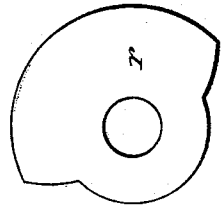
Figure 41:
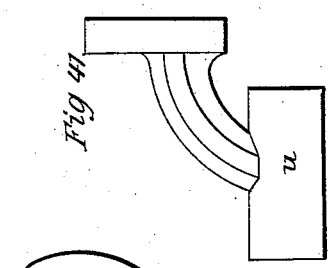
Figure 40:
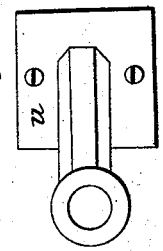
Figure 37:
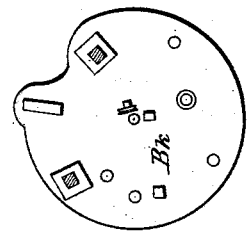
Figure 39:
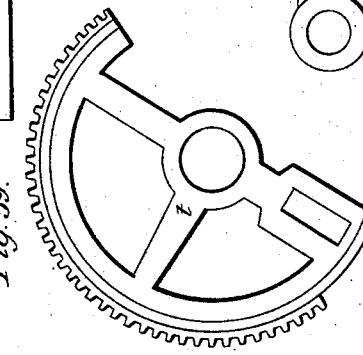
Figure 42:
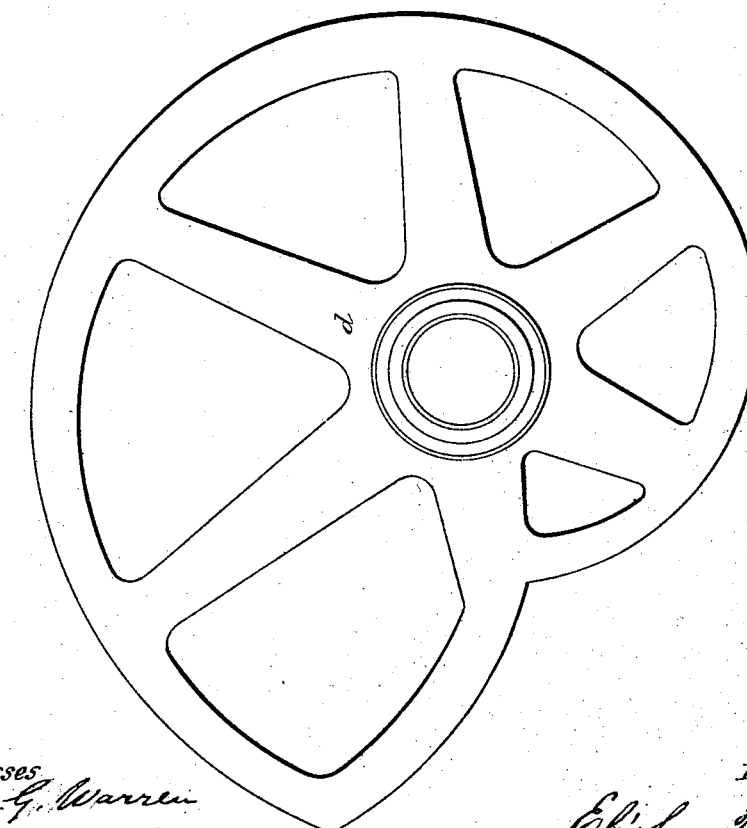

Plate I, Figure 1, is a drawing in perspective of the machine in operation. Plate II, Fig. 2, elevation of one side. Plate III, Fig. 3, elevation of one end. Fig. 4 part of the feeding works hereafter explained. Fig. 5 another view of the same with bevel gear wheel added. Plate IV, Fig. 6, elevation of the other end showing the arrangement for feeding. Plate V, Fig. 7, plan of the top of the machine. Plate VI, Fig. 8, plan of the casting of the top of the frame. Plate VII, Fig. 9, plan of the bottom or base of the frame. Plate VIII, Fig. 10, part of the frame in which are shown the stopping works. Fig. 11, the vibrating cog wheel. Fig. 12, the main connecting rod. Plate IX, figures full size, Fig. 13, showing part of the feeding works including the lever, $g$, and spring, with part of the connecting rod. Fig. 14, part of the box, $m$, in which the straws are deposited for feeding. Fig. 15, part of the feeding plate $k$ showing the arrangement by which the forceps are made to catch the straw. Plate X, full size, Fig. 16, plan of the casting of one of the two boxes, Fig. 17, plan of the other box. Fig. 18, the feeding plate, $k$ ⅓ size. Fig. 19, the bed of the feeding plate, ⅓ size. Plate XI, Fig. 20, top view of the box, with all the plates in it full size. Fig. 21, top view of the stopping works ⅓ size. Fig. 22, the vibrating disk—side view full size. Plate XII, figures full size, Fig. 23, the works of the box including the bevel cog wheel M and its comb, which are connected and fixed on a collar, which semi revolves on a shaft. Fig. 24, section of M and A $u$. Fig. 25, connecting rod. Fig. 26, lever of the shaft P. Plate XIII, Fig. 27, the vibrating wheel, upper side. Fig. 28, the throwing works. Fig. 29, the same, another view. Plate XIV, full size, Fig. 30, the arms. Plate XV, full size, Fig. 31, the feeding wheel with one of the forceps. Fig. 32, edge view of the same wheel. Figs. 33 and 34, different views of the head of the forceps. Plate XVI, full size, Fig. 35, the working plate with its apparatus. Fig. 36, section or elevation of the same, also 36 ½ the beater and vibrating wheel. Plate XVII, Fig. 37, plan of the working plate ⅓ size. Fig. 38, the comb for the beating works ⅓ size. Fig. 39, part of the beating works, the vibrating wheel. Fig. 40, the support of the vibrating pinion B $o$ Fig. 35. Fig. 41, the same. Fig. 42, the stopping. Plate XVIII, Fig. 43, longitudinal section of the stopping works see Plate XI Fig. 21 for a view of the same. The level gear wheel H and the large spur wheel G and the pinion, C, are all connected as one, and fixed upon the collar B so as to revolve upon the shaft B $x$, on which are fixed the level gear wheel I, and the ―― of the beating works $r$ and the crank. The differential pinion, J, runs upon the stem or shaft A P, which is also connected with a collar revolving upon the shaft, B. Fig. 44, the stem or shaft of the intervening bevel pinion of the stopping works. Fig. 45, part of the beating works consisting of the comb and its clasping lever or slide. Fig. 46, the catch wheel, part of the feeding works, full size. Fig. 47, section of the feeding plate, $k$, and bed, $l$.

*The driving wheel.*—This is fixed upon the shaft, E, and has a false pulley, A $c$, outside on the same shaft. The shaft, E, extends only to the middle box adjoining the pinion, F, half of the box serving for another journal, see Plate III. Upon this driving shaft, E, is fixed the pinion F, which meshes into and drives the large spur wheel, G. There is also upon the driving shaft, E, a pulley, A $e$, for a cord band, A $g$, the object of which is to drive the clearing rollers, B $m$, B $n$, on the working plate, see Fig. 35, Plate XVI.

*Vibrating wheel.* (See Plates I, VIII, and XIII, letter L.)—This is acted upon by the crank, B $d$, and connecting rod, K, and by its vibration acts upon the bevel pinions, M and N, of the throwing works. The outer cogs—those in the larger periphery—act upon the two sets, N, set in the boxes, *aa*, Fig. 16. Those on the smaller periphery act upon the other, *cc*, which is for throwing the two braiding arms, V and W. This wheel is fixed upon the central shaft, B *u*, which latter is secured at top and bottom by transverse pieces—a cross section of the top one is B *t*, Fig. 36.

*The throwing works.* (See Plates I, X, XI, XII, and XIII.)—These consist of the bevel pinion, M, and connected driver or clutch, A *u*, which are fixed to a collar on the shaft, the vibrating disk, A *w*, and the shaft, A *y*, with its crank, A *x*, (Fig. 23.) As part of these throwing works, may also be reckoned the chain rod, Q, Figs. 28 and 29, and the arms, *v* and *w*.

Plate XIV. The vibrating wheel, L, acts into the pinion, M, which is held firm upon the shaft as long as the driver, A *u*, is held between the catches, A *v*. There is, however, at each side of the vibrating disk, A *w*, a "stop" *b b*, which, as the disk revolves, forces in toward the center the head of the catch, A *v*, upon that side and lets the driver, A *u*, pass on, and the shaft stop. In the returning vibration, the driver A *u*, is again arrested by the catch, A *v*, and the shaft is acted upon till the catch-head, A *v*, reaches the stop, *b b*, when the shaft stands still, and the driver passes on. This is only to produce a semi-revolution of the shaft, and consequently a proper movement of the crank but almost an entire revolution, each way of the pinion, thus giving the crank a short pause when up, and when down. There is a spring also that rides on the top of the vibrating disk marked B *a*. The crank (Fig. 21) A *x* is attached to the connecting rod, O, and moves the chain rod, Q, this, by acting with chains directly upon the two shafts of the arms, V and W, effects the movement required.

*The stopping works.* (See Plates VIII, XI, and XVIII, Figs. 10, 21, and 43.)—These consist of the bevel pinions, J, on the shaft, A *p*, (attached to the shaft by a collar,) meshing with and running between the two bevel wheels, H and I, which run in opposite directions. This shaft, with the differential pinion, J, is connected by a rod with the lever A *d* on the same shaft with the lever *e*. This last rides upon a cam, *d*, which by the gearing is made to turn once to five of the braiding part of the machine, and, when a revolution is completed, suffers the lever, *e*, to fall to the shorter radius of the cam, and with it, consequently, the lever, A *a*, which supports J. This falling suddenly some sixty degrees of the circle suffers the wheel, I, to stop for a moment during which the feeding takes place. As the cam *a*, turns it raises the lever, *e*, and A *a*, and thus gradually raises the differential pinion, J, to its former position (during five revolutions, when it again falls and stops the process). Thus in the stopping works are also included the lever, A *a*, with its connecting rod, A *q*, the shaft, A *b*, and lever, *e*, the cam, *d*, Fig. 42, and the cord and weight, A O, Fig. 10.

*The feeding works.* (See Plates I, II, III, IV, V, IX, X, XV, Figs. 1, 2, 4, 5, 6, 7, 13, 15, 18, 19, 31, 32, 33, 34.)—These consist in a cam, *f*, a lever, *g*, on which it acts, the spring, A *r*, and support, A *s*. The connecting rod, A *m*, the hand A *l*, and the notched wheel, A *k*, upon which it acts, the shaft, A *j*, bevel pinion A *i*, acting upon the pinion, *o*, and on the same shaft, the catch wheel, *p*, Fig. 46, with its spring and catch, *q*, and also, on the same shaft, the feeding wheel, *n*, Figs. 31, 32, also as part of the feeding works. The crank, *h*, connecting rod *i* (see Plate V,) the feeding plate, *k*, and its bed, *l*, the hopper box, *m*, in which is put the straw, the follower, on which rests the spring, A *f*. The feeding is accomplished by the following process, viz.: The cam, *f*, (acting opposite to *e*,) revolves once to the braiding part five times, and on completing its revolution suddenly moves the lever, *g*, pushing by means of the connecting rod, A *m*, the notched wheel, A *k*, (see Plate III,) the distance of one notch, (which is sufficient to make a quarter of a revolution of the feeding wheel,) thus moving the shaft with its pinion, A *i*, and the pinion, *o*, (upon the horizontal shaft of the catch wheel *p*,) and feeding wheel, *n*, which, being turned one-quarter around, is held in place by the catch wheel, *p*, and spring *q*. As the quarter revolution takes place the feeding plate, *k*, has reached its limit bringing with it the straw which it has caught, and the forceps, Z, seizes it in passing. It is thus effected, the straw lies in the cut across the plate, Fig. 18, when the forceps starts, its jaws are opened by a wedge, (see Fig. 15, Plate IX, for the edge of the plate,) to which it is connected by springs, see A *t*, Plate IX. The straws, thoroughly soaked, being put into the box, *m*, and the follower put on, and the spring, A *f*, or a weight of 4 ounces, bearing upon it the motion of the crank, *h*, draws back the plate, *k*, and then the piece, *k k*, is suffered to rise a little, by means of the uneven under surface of *l*, (see Plate XVIII, Fig. 47, for a section,) when the plate, *k*, returns, the piece, *k k*, catches a straw in the groove in its end, shuts it in the cut or slot which is across the plate, and thus conveys it outside the box.

*The beating works.* (See Plates V, and XVI, XVII, Figs. 7, 35, 36, 36½, 38, 39, 40, 41, and 45.)—At each throw of the straw an operation takes place called beating. The works consist of a cam, *r*, (on the shaft, B *x*, Fig. 43). Its clasping lever or slide, S, with its connecting rod. The vibrating half wheel, t, Fig. 39, Plate 17 with its two pinions, B o, (Fig. 36½, Plate 16.) The upright shafts to which they are attached and the beaters and knife at the top of the shaft A n,—see Plate 16. The beater, x, catches the straw when it is thrown down by the feeding wheel and brings it to its place, a knife, y, cuts off the straw whose place it supplies the other beater, w, is for beating only.

The hook seen upon the beater is for the straw to fold over and thus make a straight edge for the braid. There is a cut in the eye or center, B i, into which the straw is dragged (that is sufficiently used, see Plate XVI) and cut off by the knife, y, which shuts under the plate, B i. This waste straw which is to be cut off is always carried down between the rollers B m and B n, by the same operation that brings in a straw. The two wheels, B m, and, B n, rolling together (Fig. 35, Plate XVI) and driven by the band, A g, seizes the straw the moment it is carried down, aids the cutting off, and then carries it away.

The finger, a, attached to the central shaft B u is made to move with the vibrating wheel, L, and at each movement pushes one of the forceps the length of its head. The arms, V and W, on their proper shafts, are made to throw alternately a forceps; that is, both are thrown over one side and then both to the other, one of which arms always goes without a forceps, to the extreme outside. They are alike in length and action except that one of them, W, is bent so as to let the feeding straw pass it. See Plate IV, Fig. 6½. The two other lifting arms X and Y are double at the end and each lifts two forceps. In this case one is up, while the other is down. Each forceps, Z, contains a straw, and the jaws are springs made as firm as is required to hold the straw. The braid is conveyed away by a constant tension of about a pound weight. The braid is necessarily perfectly regular, and may be made compact or the reverse, according to the tension upon it, and according to the spring of the jaws of the forceps.

It should be observed that the arm (say, W,) which is thrown outside always goes empty, that is, without a forceps, and there receives one; the head of which is pushed along by the finger, a, at the return throw. The other arm (V,) goes empty to the outside to receive another forceps pushed into it by the finger. The ends of the arms are provided with segments of the channel or groove, see Plate XV, Figs. 33½ and 33¾, in which the forceps heads move, and the feeding wheel, n, is also provided with such segments. The piece k k, on the feeding plate, k Plate 18 has a stem or rod beneath it, which extends down through the slat of the bed, l, by the uneven under surface of which the motion is produced in k k, which enables it to catch and at a proper time disengage a straw.

What I claim as my invention and desire to secure by Letters Patent is—

1. The throwing the straw by means of the arms V and W.

2. The lifting the straws by means of the arms X and Y to let the others pass.

3. The combination of the forceps Z, with the arms V, W, and X Y, to hold the straws.

4. The moving the forceps at each throw of the arms, V and W, preparatory to their transfer.

5. Folding the straw over the hooks in the manner and for the purpose described.

6. The beater for tightening the braid, in combination with the eye plate in which the braid is formed.

7. The knife, Y, for cutting off the straw, in combination with the eye plate in which the braid is formed.

8. Transferring the forceps from the feeding apparatus to the braiding apparatus and vice versa in the manner described.

9. The attaching segments of the channel in which the forceps travel or move to the ends of the arms, X and Y, and V and W, for holding and transferring the forceps. (See Figs. 33½ and 33¾ for channel.)

10. The apparatus for separating a straw from the quantity in the box, m, consisting of the piece, k k, having a groove in its end, operated on by the uneven under surface of the bed, l, in combination with the feeding plate having a channel across it.

11. The apparatus for stopping the braiding operation a moment while the feeding takes place, said apparatus consisting of the combination of the stopping cam d, with the wheels, H and I, and the differential pinion J, connected in the manner described.

12. The combination of the pinion and driver or clutch (M or N and A u) with the vibrating disk, A w, and its apparatus of catch heads (A v,) and stops, b b, to produce the kind of alternate motion above described.

13. The combination of the finger, a, on the shaft, B u with the heads of the forceps for moving them.

14. The combination of the two rollers, B m, and B n, with the knife, Y, for removing the straw.

15. The peculiar shape of the arm W (see Fig. 6½ for the shape,) to wit, the bend by which it permits the forceps in the feeding wheel, n, to pass, Given under my hand, this 16th day of October 1844.

ELISHA FITZGERALD.

Signed in presence of us:
   OWEN G. WARREN,
   H. ELLIOTT BROWNE,
   W. S. TISDALE.